United States Patent
Mi et al.

(10) Patent No.: US 7,852,559 B2
(45) Date of Patent: Dec. 14, 2010

(54) DIFFUSELY-REFLECTING POLARIZER HAVING NEARLY ISOTROPIC CONTINUOUS PHASE

(75) Inventors: Xiang-Dong Mi, Rochester, NY (US); Jehuda Greener, Rochester, NY (US); Charles C. Anderson, Penfield, NY (US); Thomas M. Laney, Spencerport, NY (US)

(73) Assignee: SKC Haas Display Films Co., Ltd., Choongchungnamdo (KR)

( * ) Notice: Subject to any disclaimer, the term of this patent is extended or adjusted under 35 U.S.C. 154(b) by 0 days.

(21) Appl. No.: 12/584,111

(22) Filed: Aug. 31, 2009

(65) Prior Publication Data

US 2009/0323184 A1 Dec. 31, 2009

Related U.S. Application Data

(62) Division of application No. 11/643,070, filed on Dec. 21, 2006, now Pat. No. 7,583,440.

(60) Provisional application No. 60/810,884, filed on Jun. 5, 2006.

(51) Int. Cl.
  *G02B 5/30* (2006.01)
(52) U.S. Cl. ........................ 359/494; 359/500; 264/1.31
(58) Field of Classification Search ........................ None
  See application file for complete search history.

(56) References Cited

U.S. PATENT DOCUMENTS 2,123,902 A  7/1938  Land
2,604,817 A  7/1952  Schupp, Jr.
4,688,900 A  8/1987  Doane et al.

(Continued)

FOREIGN PATENT DOCUMENTS

EP  1 408 351  4/2004

(Continued)

OTHER PUBLICATIONS

International Search Report of Corresponding International Application No. PCT/US2007/012670.

(Continued)

*Primary Examiner*—Lee Fineman
(74) *Attorney, Agent, or Firm*—Edwin Oh (57) ABSTRACT

The present invention provides a diffusely-reflecting polarizer comprising:
  a first polymer which is amorphous and having a birefringence of less than about 0.02 and a second polymer, the first polymer being a continuous phase, and the second polymer being a disperse phase whose index of refraction differs from said continuous phase by greater than about 0.05 along a first axis and by less than about 0.05 along a second axis orthogonal to said first axis;
  wherein the diffuse-reflectivity of said first and second polymers taken together along at least one axis for at least one polarization state of electromagnetic radiation is at least about 50%, the diffuse transmittance of said first and second polymers taken together along at least one axis for at least one polarization state of electromagnetic radiation is at least about 50%.

9 Claims, 2 Drawing Sheets

U.S. PATENT DOCUMENTS

| | | | |
|---|---|---|---|
| 4,871,784 | A | 10/1989 | Otonari et al. |
| 5,008,807 | A | 4/1991 | Krueger et al. |
| 5,217,794 | A | 6/1993 | Schrenk |
| 5,268,225 | A | 12/1993 | Isayev |
| 5,301,041 | A | 4/1994 | Noda et al. |
| 5,783,120 | A | 7/1998 | Ouderkirk et al. |
| 5,825,543 | A | 10/1998 | Ouderkirk et al. |
| 5,999,239 | A | 12/1999 | Larson |
| 2004/0116619 | A1 | 6/2004 | Moad et al. |
| 2006/0194487 | A1 | 8/2006 | Ouderkirk et al. |
| 2007/0281143 | A1 * | 12/2007 | Aylward et al. ............. 428/212 |

FOREIGN PATENT DOCUMENTS

WO    WO 2006/113380    10/2006

OTHER PUBLICATIONS

O. A. Aphonin; "Optical Properties of Stretched Polymer Dispersed Liquid Crystal Films: Angle-dependent Polarized Light Scattering"; Liquid Crystals, 1995, vol. 19, No. 4, pp. 469-480.

* cited by examiner

DIFFUSELY-REFLECTING POLARIZER HAVING NEARLY ISOTROPIC CONTINUOUS PHASE

CROSS-REFERENCE TO RELATED APPLICATION

The present application is a Divisional Application of U.S. Non-Provisional application Ser. No. 11/643,070, filed Dec. 21, 2006 now U.S. Pat. No. 7,583,440, which application claims the benefit of U.S. Provisional Application No. 60/810,884, filed Jun. 5, 2006.

FIELD OF THE INVENTION

This invention relates to a diffusely-reflecting polarizer comprising a film having a first continuous phase and a second disperse phase, the continuous phase being amorphous and nearly optically isotropic, and a method of making such a diffusely-reflecting polarizer.

BACKGROUND OF THE INVENTION

Reflective polarizing films transmit light of one polarization and reflect light of the orthogonal polarization. They are useful in an LCD to enhance light efficiency. A variety of films have been disclosed to achieve the function of the reflective polarizing films, among which diffusely reflecting polarizers are more attractive because they may not need a diffuser in a LCD, thus reducing the complexity of the LCD. U.S. Pat. Nos. 5,783,120 and 5,825,543 teach a diffusely-reflective polarizing film comprising a film containing an immiscible blend having a first continuous phase (also referred herein as the major phase, i.e., comprising more than 50 weight % of the blend) and a second disperse phase (also referred herein as the minor phase, i.e., comprising less than 50 weight % of the blend), wherein the first phase has a birefringence of at least 0.05. The film is oriented, typically by stretching, in one or more directions. The size and shape of the disperse phase particles, the volume fraction of the disperse phase, the film thickness, and the amount of orientation are chosen to attain a desired degree of diffuse reflection and total transmission of electromagnetic radiation of a desired wavelength in the resulting film. Among 124 examples shown in Table 1 through Table 4, most of which include polyethylene naphthalate (PEN) as a major and birefringent phase, with polymethyl methacrylate (PMMA) (Example 1) or syndiotactic polystyrene (sPS) (other examples) as a minor phase, except example numbers 6, 8, 10, 42-49, wherein PEN is a minor phase and sPS is a major phase. In all of these 124 examples the major phase comprises a semicrystalline polymer.

Examples 6, 8, and 10 in Table 1 showed that overall transmittance and reflectivity were not satisfactory. A figure of merit (FOM) defined as $FOM=T_{perp}/(1-0.5*(R_{perp}+R_{para}))$ was smaller than 1.27. Examples 42-49 in Table 2 did not have the transmittance and reflectivity data, and were not discussed at all.

| | Fraction sPS | Tperp | T_para | R_Perp | R_para | FOM |
|---|---|---|---|---|---|---|
| 6 | 0.75 | 80.2 | 58.4 | 19.4 | 40 | 1.14 |
| 8 | 0.75 | 76 | 41 | 23.8 | 55.6 | 1.26 |
| 10 | 0.75 | 76.8 | 48.9 | 22.4 | 49.6 | 1.20 |

(Table 1 of U.S. Pat. Nos. 5,783,120 and 5,825,543)

U.S. Pat. Nos. 5,783,120 and 5,825,543 also summarize a number of alternative films that are described in the prior art, these are discussed below.

Films filled with inorganic inclusions with different characteristics can provide optical transmission and reflective properties. However, optical films made from polymers filled with inorganic inclusions suffer from a variety of infirmities. Typically, adhesion between the inorganic particles and the polymer matrix is poor. Consequently, the optical properties of the film decline when stress or strain is applied across the matrix, both because the bond between the matrix and the inclusions is compromised, and because the rigid inorganic inclusions may be fractured. Furthermore, alignment of inorganic inclusions requires process steps and considerations that complicate manufacturing.

Other films, such as that disclosed in U.S. Pat. No. 4,688,900 (Doane et. al.), consists of a clear light-transmitting continuous polymer matrix, with droplets of light modulating liquid crystals dispersed within. Stretching of the material reportedly results in a distortion of the liquid crystal droplet from a spherical to an ellipsoidal shape, with the long axis of the ellipsoid parallel to the direction of stretch. U.S. Pat. No. 5,301,041 (Konuma et al.) make a similar disclosure, but achieve the distortion of the liquid crystal droplet through the application of pressure. A. Aphonin, "Optical Properties of Stretched Polymer Dispersed Liquid Crystal Films: Angle-Dependent Polarized Light Scattering, Liquid Crystals, Vol. 19, No. 4, 469-480 (1995), discusses the optical properties of stretched films consisting of liquid crystal droplets disposed within a polymer matrix. He reports that the elongation of the droplets into an ellipsoidal shape, with their long axes parallel to the stretch direction, imparts an oriented birefringence (refractive index difference among the dimensional axes of the droplet) to the droplets, resulting in a relative refractive index mismatch between the dispersed and continuous phases along certain film axes, and a relative index match along the other film axes. Such liquid crystal droplets are not small as compared to visible wavelengths in the film, and thus the optical properties of such films have a substantial diffuse component to their reflective and transmissive properties. Aphonin suggests the use of these materials as a polarizing diffuser for backlit twisted nematic LCDs. However, optical films employing liquid crystals as the disperse phase are substantially limited in the degree of refractive index mismatch between the matrix phase and the dispersed phase.

Furthermore, the birefringence of the liquid crystal component of such films is typically sensitive to temperature. U.S. Pat. No. 5,268,225 (Isayev) discloses a composite laminate made from thermotropic liquid crystal polymer blends. The blend consists of two liquid crystal polymers which are immiscible with each other. The blends may be cast into a film consisting of a dispersed inclusion phase and a continuous phase. When the film is stretched, the dispersed phase forms a series of fibers whose axes are aligned in the direction of stretch. While the film is described as having improved mechanical properties, no mention is made of the optical properties of the film. However, due to their liquid crystal nature, films of this type would suffer from the infirmities of other liquid crystal materials discussed above.

Still other films have been made to exhibit desirable optical properties through the application of electric or magnetic fields. For example, U.S. Pat. No. 5,008,807 (Waters et al.) describes a liquid crystal device which consists of a layer of fibers permeated with liquid crystal material and disposed between two electrodes. A voltage across the electrodes produces an electric field which changes the birefringent properties of the liquid crystal material, resulting in various degrees of mismatch between the refractive indices of the fibers and the liquid crystal. However, the requirement of an electric or magnetic field is inconvenient and undesirable in many applications, particularly those where existing fields might produce interference.

Other optical films have been made by incorporating a dispersion of inclusions of a first polymer into a second polymer, and then stretching the resulting composite in one or two directions. U.S. Pat. No. 4,871,784 (Otonari et al.) is exemplary of this technology. The polymers are selected such that there is low adhesion between the dispersed phase and the surrounding matrix polymer, so that an elliptical void is formed around each inclusion when the film is stretched. Such voids have dimensions of the order of visible wavelengths. The refractive index mismatch between the void and the polymer in these "microvoided" films is typically quite large (about 0.5), causing substantial diffuse reflection. However, the optical properties of microvoided materials are difficult to control because of variations of the geometry of the interfaces, and it is not possible to produce a film axis for which refractive indices are relatively matched, as would be useful for polarization-sensitive optical properties. Furthermore, the voids in such material can be easily collapsed through exposure to heat and pressure.

A polarization sensitive scattering element (PSSE) has been described by in U.S. Pat. Nos. 5,751,388, 5,999,239, and 6,310,671 (Larson). Here, the PSSE is a microstructural composite of material domains having differing birefringence and wherein the PSSE transmits the majority of the light polarized along one optical axis while randomly backscattering the majority of the light polarized along a second optical axis.

Optical films have also been made wherein a dispersed phase is deterministically arranged in an ordered pattern within a continuous matrix. U.S. Pat. No. 5,217,794 (Schrenk) is exemplary of this technology. There, a lamellar polymeric film is disclosed which is made of polymeric inclusions which are large compared with wavelength on two axes, disposed within a continuous matrix of another polymeric material. The refractive index of the dispersed phase differs significantly from that of the continuous phase along one or more of the laminate's axes, and is relatively well matched along another. Because of the ordering of the dispersed phase, films of this type exhibit strong iridescence (i.e., interference-based angle dependent coloring) for instances in which they are substantially reflective. As a result, such films have seen limited use for optical applications where optical diffusion is desirable.

There thus remains a need for an improved diffusely-reflecting polarizer comprising a film having a continuous phase and a disperse phase that avoids the limitations of the prior art. The improved reflecting polarizer should have a continuous phase (the major phase) that is a relatively inexpensive material and that is amorphous, rather than crystalline or semicrystalline, to minimize haze, so the refractive index mismatch between the two phases along the material's three dimensional axes can be conveniently and permanently manipulated to achieve desirable degrees of diffuse and specular reflection and transmission. The film is also desirably stable with respect to stress, strain, temperature differences, moisture, and electric and magnetic fields, and wherein the film has an insignificant level of iridescence. These and other needs are met by the present invention, as hereinafter disclosed.

SUMMARY OF THE INVENTION

A diffusely-reflecting polarizer comprising:
a first polymer and a second polymer;
wherein the first polymer, which forms a continuous phases, is amorphous and has a birefringence of less than about 0.02 and the second polymer, which forms a disperse phase, has an index of refraction that differs from said continuous phase by greater than about 0.05 along a first axis and by less than about 0.05 along a second axis orthogonal to said first axis;
wherein the diffuse-reflectivity of said first and second polymers taken together along at least one axis for at least one polarization state of electromagnetic radiation is at least about 50%.

The invention also provides a method of making such a polarizer and the use of such a polarizer in a Liquid Crystal Display.

DETAILED DESCRIPTION OF THE INVENTION

Definitions

The terms "specular reflectivity", "specular reflection", or "specular reflectance" $R_s$ refer to the reflectance of light rays into an emergent cone with a vertex angle of 16 degrees centered around the specular angle. The terms "diffuse reflectivity", "diffuse reflection", or "diffuse reflectance" $R_d$ refer to the reflection of rays that are outside the specular cone defined above. The terms "total reflectivity", "total reflectance", or "total reflection" $R_t$ refer to the combined reflectance of all light from a surface. Thus, total reflection is the sum of specular and diffuse reflection.

Similarly, the terms "specular transmission" and "specular transmittance" $T_s$ are used herein in reference to the transmission of rays into an emergent cone with a vertex angle of 16 degrees centered around the specular direction. The terms "diffuse transmission" and "diffuse transmittance" $T_d$ are used herein in reference to the transmission of all rays that are outside the specular cone defined above. The terms "total transmission" or "total transmittance" $T_t$ refer to the combined transmission of all light through an optical body. Thus, total transmission is the sum of specular and diffuse transmission. In general, each diffusely reflecting polarizer is characterized by a diffuse reflectivity $R_{1d}$, a specular reflectivity $R_{1s}$, a total reflectivity $R_{1t}$, a diffuse transmittance $T_{1d}$, a specular transmittance $T_{1s}$, and a total transmittance $T_{1t}$, along a first axis for one polarization state of electromagnetic radiation, and a diffuse reflectivity $R_{2d}$, a specular reflectivity $R_{2s}$, a total reflectivity $R_{2t}$, a diffuse transmittance $T_{2d}$, a specular transmittance $T_{2s}$, and a total transmittance $T_{2t}$ along a second axis for another polarization state of electromagnetic radiation. The first axis and second axis are perpendicular to each other and each is perpendicular to the thickness direction of the diffusely reflecting polarizer. Without the loss of generality, the first axis and the second axis are chosen such as the total reflectivity along the first axis is greater than that along the second axis (i.e., $R_{1t} > R_{2t}$) and the total transmittance along the first axis is less than that along the second axis (i.e., $T_{1t} < T_{2t}$).

Diffuse reflectivity, specular reflectivity, total reflectivity, diffuse transmittance, specular transmittance, total transmittance, as used herein, generally have the same meanings as defined in U.S. Pat. Nos. 5,783,120 and 5,825,543.

Figure of Merit (FOM)

The diffusely reflecting polarizers made according to the present invention all satisfy $$R_{1d} > R_{1s} \qquad \text{Equation (1)}$$

$$\text{FOM} \equiv T_{2t}/(1-0.5(R_{1t}+R_{2t})) > 1.35 \qquad \text{Equation (2)}$$

Equation (1) mean that the reflecting polarizers of the present invention are more diffusive than specular in reflection. It is noted that a wire grid polarizer (e.g., as available from Moxtek, Inc., Orem, Utah), a multilayer interference-based polarizer such as Vikuiti™ Dual Brightness Enhancement Film, manufactured by 3M, St. Paul, Minn., or a cholesteric liquid crystal based reflective polarizer are more specular than diffusive.

Equation (3) defines the figure of merit $\text{FOM} \equiv T_{2t}/(1-0.5(R_{1t}+R_{2t}))$ for the diffusively reflecting polarizer, and the equation states that the figure of merit FOM is greater than 1.35. For polarization recycling, what matters is the total reflection and total transmission, so only total reflection and total transmission are used to compute the FOM for the purpose of ranking different reflective polarizers. The figure of merit describes the total light throughput of a reflective polarizer and an absorptive polarizer such as a back polarizer used in an LCD, and is essentially the same as equation (1)

$$T1 = \frac{T_p}{1 - 0.5(R_s + R_p)R}$$

discussed in U.S. Patent Application Publication No. 2006/0061862, which applies to LCD systems where the light recycling is effected using a diffusive reflector or its equivalent. It is noted that R accounts for the reflectivity of the recycling reflective film, or the efficiency associated with each light recycling. In an ideal case, R is equal to 1, which means that there is no light loss in the light recycling. When R is less than 1, there is some light loss in the light recycling path. It is also noted that other forms of figure of merit can be used, however, the relative ranking of the reflective polarizers remain the same. For the purpose of quantifying and ranking the performance of a reflective polarizer, $\text{FOM} \equiv T_{2t}/(1-0.5(R_{1t}+R_{2t}))$ will be used in this application. The extinction ratio $T_{2t}/T_{1t}$ or $R_{1t}/R_{2t}$ may not be proper to describe a reflective polarizer because a reflective polarizer having a higher $T_{2t}/T_{1t}$ or $R_{1t}/R_{2t}$ may not necessarily perform better than one having a lower extinction ratio. For an ideal conventional absorptive polarizer, $T_{2t}=1$, $R_{1t}=R_{2t}=0$, so FOM=1. For an ideal reflective polarizer, $T_{2t}=1$, $R_{1t}=1$, and $R_{2t}=0$, so FOM=2. The diffusive reflecting polarizers, as disclosed in example numbers 6, 8, 10 of U.S. Pat. Nos. 5,783,120 and 5,825,543, having sPS as the major phase had the FOM<1.27, which were not satisfactory. As will be shown hereinbelow, the diffusively reflecting polarizers according to the present invention have the FOM greater than 1.35, more preferably greater than 1.5. Though some diffusive reflecting polarizers as disclosed in U.S. Pat. Nos. 5,783,120 and 5,825,543 had the FOM greater than 1.35, they were composed of a continuous phase with a birefringence of greater than 0.05 and a disperse phase with smaller birefringence.

Amorphous and Semi-Crystalline Polymers

A polymer that does not produce crystallization (exothermic) or melting (endothermic) peaks during a differential scanning calorimetry (DSC) test over a temperature ranging from below its glass transition temperature (Tg) to Tg+250° C. is said to be amorphous. Conversely, if such peaks are recorded in a DSC test the polymeric material is semi-crystalline. The DSC test is well known to those skilled in the art. In the present invention, a semi-crystalline polymer is not well suited for the continuous phase because of its propensity to thermally crystallize during stretching at elevated temperatures and thus produce an undesirable level of haze.

Immiscible and Compatible Polymer Blends

Polymers that are thermodynamically incompatible when mixed together in the melt state are said to be immiscible. Such polymers will separate into distinct phases having coarse morphology and create an inhomogeneous blend, with each phase maintaining the distinct characteristics of the polymer components and poor adhesion between the phases. Compatible blends on the other hand exhibit fine phase morphology and good adhesion between the polymers comprising the blend.

Birefringence, Weakly Birefringent, and Nearly Optically Isotropic

The quantity (nx−ny) is referred to as in-plane birefringence, $\Delta n_{in}$, where nx and ny are indices of refraction in the direction of x and y; x is taken as the direction of maximum index of refraction in the x-y plane and y direction is taken perpendicular to it; the x-y plane is parallel to the surface plane of the layer; and d is a thickness of the layer in the z-direction. The value of $\Delta n_{in}$ is typically given at a wavelength $\lambda$=550 nm.

The quantity [nz−(nx+ny)/2] is referred to as out-of-plane birefringence, $\Delta n_{th}$, where nz is the index of refraction in the z-direction. If nz>(nx+ny)/2, $\Delta n_{th}$ is positive (positive birefringence), and if nz<(nx+ny)/2, $\Delta n_{th}$ is negative (negative birefringence). The value of $\Delta n_{th}$ is typically given at $\lambda$=550 nm.

As used herein, "nearly optically isotropic" or "weakly birefringent" means that after stretching, the material has a birefringence less than 0.02.

The current invention regarding a diffusely reflecting polarizer comprising a continuous phase and a disperse phase, the continuous phase being nearly isotropic, and a method of making such a diffusely reflecting polarizer is described hereinbelow and by referring to the drawings. The diffusely reflecting polarizers of the invention are effectively employed in a display device such as an LCD to enhance light efficiency.

Figure 1:
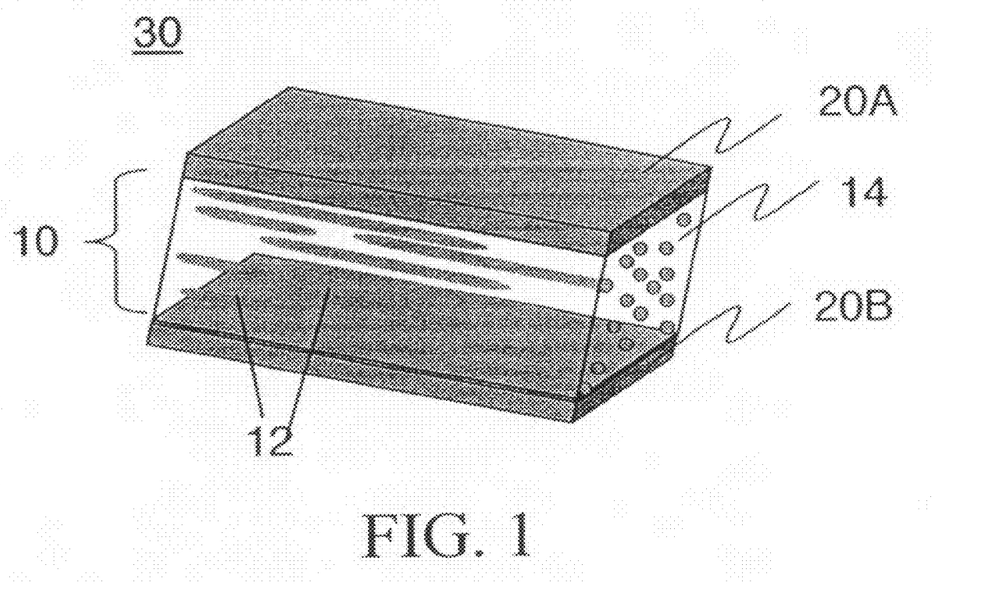
FIG. 1 is a schematic perspective drawing illustrating a diffusely reflecting polarizer made in accordance with the present invention, in which the polarizer has a core layer that contains a disperse phase that is highly birefringent and a continuous phase that is nearly or completely optically isotropic and the core layer is disposed between two outer (protective) layers.

Referring now to FIG. 1, the diffusely reflecting polarizer of the present invention 30 comprises a film 10 comprising an immiscible blend having a first polymeric phase 14 that is a continuous phase that is amorphous and has a birefringence of less than about 0.02 and a second polymeric phase 12 that is a disperse phase that is typically semicrystalline, the said disperse phase 12, whose index of refraction differs from said continuous phase 14 by greater than about 0.05 along a first axis and by less than about 0.05 along a second axis orthogonal to said first axis; wherein the diffuse reflectivity of said first and second phases taken together along at least one axis for at least one polarization state of electromagnetic radiation is at least about 50%. Optionally, the polarizer 30 may comprise additional layers (protective layers or "skin" layers 20A and 20B are illustrated in FIG. 1 for example), these additional layers may be employed to facilitate stretching of the multilayer film or to improve one or more physical, chemical, or thermal properties of the reflective polarizer or to provide physical protection to the core layer.

The concentration of the continuous phase is at least 50% by weight while the concentration of the disperse phase is less than 50% by weight of the total material in the film 10. Preferably the continuous phase is at least 60% by weight and the disperse phase is less than 40 weight %.

The first polymeric phase that is the continuous phase may comprise a single polymer or two or more miscible polymers. The second polymeric phase that is the disperse phase may also comprise a single polymer or two or more miscible polymers. Typically, each of the two phases comprises only a single polymer. However, a blend of two or more miscible polymers may be effectively employed in either phase in order to optimize or modify various properties such as melt viscosity, Tg, physical properties, thermal properties, refractive index, etc.

The one or more polymers comprising the continuous phase are amorphous, transmissive and weakly birefringent. The one or more polymers comprising the disperse phase are semi-crystalline, transmissive and highly birefringent. Small birefringence values are achieved by selecting polymers that have very low stress-optical coefficients and/or by stretching the film at a temperature $(T_s)$ well above the glass transition temperature of the polymers comprising the continuous phase, $T_s > T_{g,1} + 30°$ C. (where $T_{g,1}$ is the $T_g$ of the continuous phase), such that the optical orientation is allowed to relax sufficiently to reduce the level of in-plane birefringence to below 0.02, preferably below 0.01, and more preferably below 0.005, as the material solidifies after stretching. Examples of polymers for use in the continuous phase include cyclo olefin polymers, acrylic polymers, styrenic polymers, copolyesters, and other amorphous polymers. Specific, non-limiting examples include cyclic olefin copolymers such as the family of Topas® polymers (available from Topas Advanced Polymers GmbH) and Apel® polymers (available from Mitsui Chemicals Inc.), PMMA and Poly(MMA-co-Styrene), and amorphous copolyesters such as PETG 6763, SA100, SA115, and PCTG 5445 (available from Eastman Chemical). Particularly preferred polymers are cyclic olefin copolymers containing one or more norbornene units such as those disclosed in general formulas I to V in U.S. Pat. No. 5,833,878.

These cyclic olefin copolymers (COC), are remarkably glass-like organic material. COC materials have a luminous transmittance of 91% in the visible region. In addition to their high transmittance and high Abbé number (58), COC resins have very low haze and yellowness, ensuring minimal light loss by scattering or absorption. As amorphous polymers with low optical anisotropy, they also have inherently low birefringence and a very low stress-optic coefficient—as low or even lower than that of PMMA—so that they retain low birefringence under load. Grades of COC resins are available with heat deflection temperatures as high as 170° C. (338° F.) making them tolerant of short term exposures to quite high temperatures. COC resins provide excellent moisture control. It has roughly double the moisture barrier of high-density polyethylene (HDPE) and five times the moisture barrier of low-density polyethylene (LDPE). COC resins are environmentally-friendly and permit easy disposal. On combustion it forms no toxic gases but only water and carbon dioxide.

High values of birefringence are achieved by utilizing materials with relatively high stress-optical coefficient and by stretching the film at a temperature $T_s$ such that: $T_{g,2} < T_s < T_{g,2} + 30°$ C. (where $T_{g,2}$ is the $T_g$ of the disperse phase). Examples of polymers suitable for use in the disperse phase include polyesters, polyamides, and polyesteramides and other classes of semicrystalline polymers. Specific non-limiting examples include poly(ethylene terephthalate) (PET), poly(ethylene naphthalate) (PEN), and polyesters containing the cyclohexyl dimethylene moiety.

In one embodiment of the invention, at least one of the continuous and dispersed phases comprises a compatible polyester blend and a means of substantially inhibiting a transesterification reaction. The polyester blend may comprise one or more polyesters or at least one polyester and a polycarbonate. Transesterification inhibitors are well known in the polymer processing industry and generally comprise a phosphorous compound. Suitable transesterification inhibitors for use in the present invention include organophosphites such as triphenyl phosphite, bis(2,4-di-t-butylphenyl)pentaerythritol diphosphite, di-n-octadecyl phosphite, tris(2,4-di-t-butylphenyl)phosphite, tris(monononylphenyl)phosphite, trimethyl phosphite, triethyl phosphite, and others.

The diffusely reflecting polarizers of the invention may be used in combination with one or more other optical films that are typically employed in display devices such as LCDs, including, for example, films that provide the function of antireflection, ambient light suppression, illumination enhancement, light collimation, light directing, light diffusion, light spreading, viewing angle enhancement, polarization, and the like The diffusely reflecting polarizer of the present invention is produced by a multi-step process. First, all the components comprising the first continuous phase and second disperse phase are dry-blended together at a desired composition. The blending may comprise additional melt blending steps involving a twin-screw extruder or a static mixer. The mixture is then fed into an extruder and is then cast through a sheeting die or a multi-manifold die onto a roll stack and a calendar. The cast sheet must undergo a stretching step in order to induce the desired birefringence in the disperse phase of the film. In all cases the sheet is first heated to a temperature $T_s$, such that: $T_{g,1} < T_s < T_{g,2} + 30°$ C. and is then stretched uniaxially, along the machine direction or along the cross-machine direction, or both, to produce the desired level of in-plane birefringence in the disperse phase. Thus, the stretching temperature must meet the following conditions:

$T_{g,1} < T_s$ $T_{g,2} < T_s < T_{g,2} + 30°$ C.

(where $T_{g,1}$ and $T_{g,2}$ are the $T_g$'s of the first (continuous) and second (disperse) phase, respectively)

If the continuous phase has a high stress-optical coefficient then $T_s - T_{g,1} > 30°$ C., i.e., the temperature interval must be relatively large to achieve low birefringence in the continuous phase (that is, the birefringence of the continuous phase is less than 0.02 after stretching and solidification).

Typical extension or stretch ratios range from 3× to 7× although a wider range of stretch ratios may be considered.

Stretching can be done using a number of methods well known to those skilled in the art. In some cases the edges of the stretched film can be restrained during the stretching step although unrestrained stretch is preferred. Compared to the approach of U.S. Pat. Nos. 5,783,120 and 5,825,543, the present invention provides a wide range of options and materials with the possibility of lower cost and superior optical performance without the limitations defined in the prior art.

After stretching, the total thickness of the reflecting polarizer of the invention is about 25 to 1000 microns in thickness. Typically, the total thickness is about 100 to 500 microns in thickness to achieve the desired degree of polarization recycling and dimensional stability.

Figure 2:
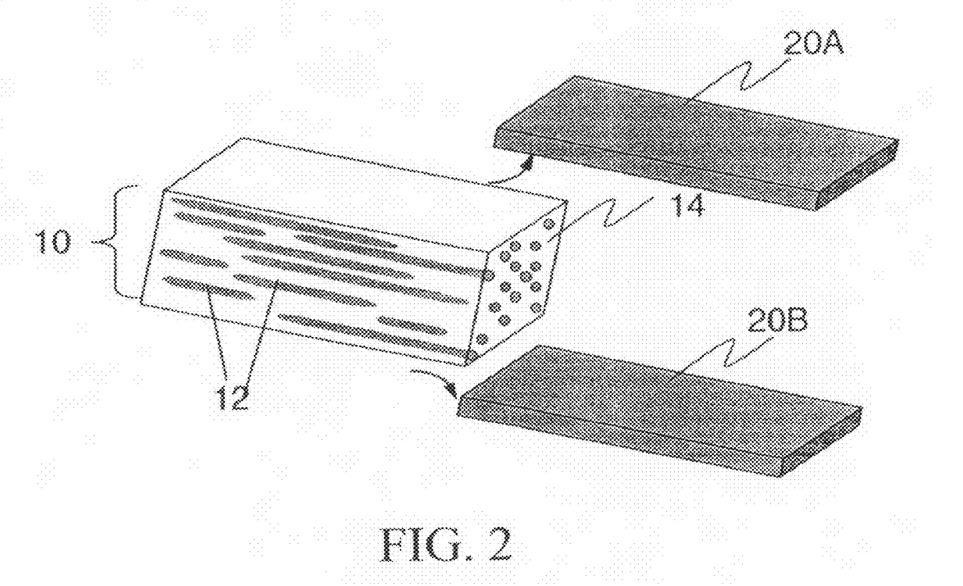
FIG. 2 is a schematic perspective drawing illustrating the diffusely reflecting polarizer shown in FIG. 1 with the two protective layers removed.
Figure 3:
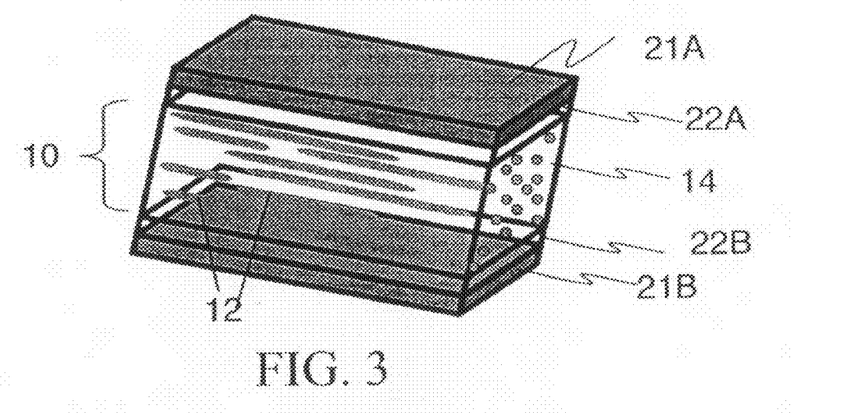
FIG. 3. is a schematic perspective drawing illustrating a diffusely reflecting polarizer with two protective layers formed of materials which are neither the continuous phase material nor the disperse phase material.

As mentioned previously, in one embodiment of the invention the reflective polarizer 30 is produced with protective layers 20A and 20B on each side of film 10, see FIG. 1. The protective layers are co-extruded and co-stretched with the film 10 and comprise a material similar to and possibly identical to the composition of the disperse phase. The stretched sheet is finally cooled down and wound on a roll. The protective layers 20A and 20B can remain permanently attached to the film 10 or peeled off at some time before the reflective polarizer is assembled in the LC display. The peeling of the protective layers is illustrated in FIG. 2 and requires that they are held by weak adhesion forces to film 10. This level of adhesion can be controlled by the addition of suitable compatibilizing agents, polymeric surfactants, plasticizers and various other addenda. Alternatively the adhesion between the protective layers and the film 10 can be enhanced by addition of tie layers as shown in FIG. 4 wherein layers 22A and 22B represent tie layers disposed between film 10 and corresponding protective layers 21A and 21B. Suitable materials for use in the tie layers should have some compatibility or affinity for the continuous polymeric phases employed in the film 10 and the protective layers 21A and 21B. For one embodiment in which the continuous phase comprises a cyclic olefin copolymer and the protective layers comprise a polyester, suitable tie layer materials include ethylene-vinyl acetate polymers and ethylene-acrylate polymers.

EXAMPLES

A diffusely reflecting polarizer was made in accordance with the invention by extruding a blend of a first polymeric phase and a second polymeric phase. The dry component mixture was fed at a desired composition into a single screw extruder. The blend was coextruded through a multi-manifold die with a protective layer on either side of the immiscible blend film comprising the phases. After exiting the die the cast sheet passed through a three roll stack comprising a pair of calendar rolls to improve its surface quality. After casting, the total sheet thickness was about 800 microns, and the protective layers had a combined thickness of approximately ¼ of the total sheet thickness. The three-layered cast sheet was then stretched along the machine direction to induce birefringence in the birefringent disperse phase.

The sheet was first heated to the nominal stretching temperature $T_s$ and then stretched along the machine direction in the uniaxial unconstrained mode by a factor of 3× to 5×. In the case where the disperse phase was PET, the stretching temperature was varied at 90° C., 95° C., 98° C., 101° C., 104° C., and 107° C. In the case where the disperse phase was PEN, the stretching temperature was varied at 125° C., 128° C., 132° C., 135° C., 139° C. and 148° C. The stretching temperatures were chosen to satisfy:

$$T_{g,2}+30°\,C.>T_s>T_{g,2}$$

$$T_s>T_{g,1}$$

The stretched sheet was cooled down and the protective layers were peeled off to yield the final diffusely reflecting polarizer film. The oriented samples were then cut and tested using a Perkin Elmer 650 UV-VIS spectrometer. The total transmittance and reflectance (reflectivity) of the stretched film samples was measured and expressed at 550 nm and a figure of merit (FOM) was computed based on Equation 3. Diffuse reflectivity was measured using an integrating sphere to capture all the reflected light excluding light rays falling into an emergent cone with a vertex angle of 16 degrees centered around the specular angle. Specular reflectivity was determined by subtracting the measured diffuse reflectivity from the measured total reflectivity.

A list of all the materials, compositions, stretching conditions and corresponding FOM values for the stretched film samples is given in following Tables.

TABLE 1

List of Materials

| Material ID | Generic | Source | $T_g$ (° C.) | Ref. Index (@ 550 nm) |
|---|---|---|---|---|
| Eastar 7352 | PET | Eastman Chemical | 76 | 1.54 |
| PEN | PEN | Eastman Kodak | 120 | 1.57 |
| Topas 8007 | COC | Topas Advanced Materials | 77 | 1.53 |
| PETG 6763 | Polyester | Eastman Chemical | 81 | 1.54 |
| PCTG 5445 | Polyester | Eastman Chemical | | |
| SB | Styrene-co-butadiene | | 70 | 1.57 |
| Zylar 631 | MMA-co-styrene | Nova Chemicals | 95 | 1.56 |

Birefringence of the Continuous Phase and the Disperse Phase

Example 1

Pure continuous phase polymers Topas 8007, SB, Zylar 631, PETG 6763, and PCTG 5445 were coextruded with protective layers PET or PEN, and were stretched under the same conditions as the blends comprising the continuous and the disperse phases, i.e., at the same stretching temperature and the same stretching ratio. The skin layers were then peeled off. The refractive indices $n_{para}$, $n_{perp}$, and $n_z$ of each core layer consisting of pure amorphous polymer were then measured using the Metricon Prism Coupler 2010 from Metricon Corporation determined at the wavelength of 633 nm. The refractive indices $n_{para}$, $n_{perp}$, and $n_z$ correspond to the directions parallel to the stretching direction, perpendicular to the stretching direction, and along the sheet thickness direction, respectively. All the three indices $n_{perp}$, and $n_z$ are very close to each other, with the difference between any two of them is less than 0.02, and the difference in most cases was smaller than 0.005. The refractive indices $n_{para}$, $n_{perp}$, and $n_z$ of the skin layer which is either PET or PEN were also measured using the Metricon Prism Coupler 2010 from Metricon Corporation determined at the wavelength of 633 nm.

The difference between $n_{para}$, $n_{perp}$ is greater than 0.05. This set of measurements confirmed that the continuous phase (major phase) is nearly isotropic, while the disperse phase (minor phase) is highly birefringent. This conclusion was also confirmed with birefringence measurement using M-2000V Spectroscopic Ellipsometer from the J. A. Woollam Co. (Lincoln, Nebr.).

Example 2

70% wt. Zylar 631 as the continuous phase polymer, 30% wt. PEN as the dispersed polymer, protective layer PEN, stretched 5× in the extruded film direction at a temperature of 125° C. This sample had an FOM value of 1.66 and had a total reflectivity of 83%, a diffuse reflectivity of 71% and a specular reflectivity of 12% (all measured at 550 nm).

Example 3

60% wt. PETG 6763 as the continuous phase polymer and 40% wt. PEN as the dispersed polymer, stretched 5× in the direction perpendicular to the extruded film direction at a temperature of 132° C. This sample had an FOM value of 1.43 and had a total reflectivity of 73%, a diffuse reflectivity of 62% and a specular reflectivity of 11% (all measured at 550 nm).

Example 4

60% wt. PETG 6763 as the continuous phase polymer, 40% wt. PEN as the dispersed polymer, and 0.032 parts per hundred phosphoric acid added as a stabilizer (transesterification inhibitor), stretched 5× in the direction perpendicular to the extruded film direction at a temperature of 129° C. This sample had an FOM value of 1.37 and had a total reflectivity of 76%, a diffuse reflectivity of 61% and a specular reflectivity of 15% (all measured at 550 nm).

Examples 2-4 demonstrate that reflective polarizers of the invention provide reflectivity that is predominantly diffuse in nature and satisfy the conditions that the diffuse reflectivity is greater than 50% and FOM is greater than 1.35.

Impact of Disperse Polymer Weight Percent

Continuous phase polymer Topas 8007, disperse polymer Eastar 7352, protective layer Eastar 7352, stretching ratio 4× at temperature 95° C. for 3 minutes soak time.

TABLE 1-1

| Example No. | PET Weight Percent | FOM |
| --- | --- | --- |
| 5 | 5 | 1.12 |
| 6 | 10 | 1.12 |
| 7 | 15 | 1.21 |
| 8 | 30 | 1.43 |
| 9 | 50 | 1.42 |

Continuous phase polymer Topas 8007, disperse polymer PET (Eastar 7352), protective layer PET, stretching ratio 5× at temperature 98° C. for 3 minutes soak time.

TABLE 1-2

| Example No. | PET Weight Percent | FOM |
| --- | --- | --- |
| 10 | 5 | 1.18 |
| 11 | 10 | 1.25 |

TABLE 1-2-continued

| Example No. | PET Weight Percent | FOM |
| --- | --- | --- |
| 12 | 15 | 1.30 |
| 13 | 20 | 1.38 |
| 14 | 30 | 1.45 |
| 15 | 50 | 1.46 |

Continuous phase polymer SB, disperse polymer PEN, protective layer PEN, stretching ratio 4× at temperature 132° C. for 3 minutes soak time.

TABLE 1-3

| Example No. | PEN Weight Percent | FOM |
| --- | --- | --- |
| 16 | 20 | 1.40 |
| 17 | 40 | 1.47 |

Continuous phase polymer Zylar, disperse polymer PEN, protective layer PEN, stretching ratio 4× at temperature 128° C. for 3 minutes soak time.

TABLE 1-4

| Example No. | PEN Weight Percent | FOM |
| --- | --- | --- |
| 18 | 5 | 1.32 |
| 19 | 10 | 1.40 |
| 20 | 15 | 1.45 |
| 21 | 20 | 1.53 |

Tables 1-1 through 1-4 show that when other conditions were fixed, a suitable disperse polymer weight percent can be selected to enable the diffusely reflecting polarizer to have FOM greater than 1.30. The suitable disperse polymer weight percent range was between 45% and 5%.

Impact of Stretching Ratio

70% wt. continuous phase polymer Topas 8007, 30% wt. disperse polymer PET, protective layer PET, stretched at temperature 95° C. for 3 minutes soak time.

TABLE 2-1

| Example No. | Stretch ratio | FOM |
| --- | --- | --- |
| 22 | 3 | 1.28 |
| 23 | 4 | 1.43 |
| 24 | 5 | 1.44 |

70% wt. continuous phase polymer Topas 8007, 30% wt. disperse polymer Eastar 7352, protective layer Eastar 7352, stretched at temperature 101° C. for 3 minutes soak time.

TABLE 2-2

| Example No. | Stretch ratio | FOM |
| --- | --- | --- |
| 25 | 3 | 1.28 |
| 26 | 4 | 1.34 |
| 27 | 5 | 1.41 |

Tables 2-1 and 2-2 show that when other conditions were fixed, a suitable stretching ratio can be selected to enable the diffusely reflecting polarizer to have FOM greater than 1.30. The suitable stretching ratio was at least 3×, and the desired stretching ratio was 5× or more.

Impact of Stretching Temperature

70% wt. continuous phase polymer Topas 8007, 30% wt. disperse polymer PET, protective layer PET, stretched by 4×, for 3 minutes soak time.

TABLE 3-1

| Example No. | Temperature | FOM |
|---|---|---|
| 28 | 95 | 1.43 |
| 29 | 98 | 1.36 |
| 30 | 101 | 1.46 |

60% wt. continuous phase polymer S/B, 40% wt. disperse polymer PEN, protective layer PEN, stretched by 4×, for 3 minutes soak time.

TABLE 3-2

| Example No. | Temperature | FOM |
|---|---|---|
| 31 | 128 | 1.37 |
| 32 | 132 | 1.47 |
| 33 | 148 | 1.31 |

Tables 3-1 and 3-2 show that when other conditions were fixed, a suitable stretching temperature can be selected to enable the diffusely reflecting polarizer to have FOM greater than 1.30.

Impact of Continuous Phase Polymer and its Concentration

Examples 34-37

80% wt. continuous phase polymer, 20% wt. disperse polymer PEN, protective layer PEN, stretched by 4× at temperature of 125° C., for 3 minutes soak time. Example 37: 70% wt. continuous phase polymer, 30% wt. disperse polymer, protective layer PEN, stretched by 4.5× at temperature of 128° C., for 3 minutes soak time.

TABLE 4-1

| No. | Continuous phase Polymer | FOM |
|---|---|---|
| 34 | PCTG 5445 | 1.34 |
| 35 | Zylar 631 | 1.53 |
| 36 | PETG 6763 | 1.12 |
| 37 | PETG 6763 | 1.64 |

Tables 4-1 shows that when other conditions were fixed, the choice of continuous phase polymer has an impact on the FOM of the diffusely reflecting polarizer.

Diffusely Transmitting Reflective Polarizer

Example 38

70% wt. Zylar 631 as the continuous phase polymer, 30% wt. PEN as the dispersed polymer, protective layer PEN, stretched 5× at a temperature of 125° C. (using a 3 minute soak time prior to stretching). This sample had an FOM value of 1.66 and had a diffuse transmittance of 64% and a specular transmittance of 16% (all measured at 550 nm). Therefore, for this sample the diffuse transmittance comprised 80% of the total transmittance and the specular transmittance comprised only 20% of the total transmittance.

Impact of Skin Layer

For all the samples No. 5-15 and 22-30, measurements were made both with the PET skin layer attached and with the PET skin layer removed. The samples without the skin layer had a rough surface. It was found that samples without the skin layer (rough surface) had a diffuse transmittance of around 45% while the same sample with the skin layer attached had a diffuse transmittance of around 10%. The samples without the skin layer had a small reduction in FOM compared to the same sample with the skin layer. In addition to removal of a skin layer, other methods to obtain a rough, diffusive surface include embossing or otherwise surface-patterning a permanent skin layer or a layer comprising scattering particles may be applied onto the reflective polarizer surface by coating or lamination methods.

The invention has been described in detail with particular reference to certain preferred embodiments thereof, but it will be understood that variations and modifications can be effected within the spirit and scope of the invention. The entire contents of the patents and other publications referred to in this specification are incorporated herein by reference.

PARTS LIST 10 immiscible blend film
12 disperse phase
14 continuous phase
20A, 20B protective layers
21A, 21B protective layers
22A, 22B tie layers
30 diffusely reflecting polarizer

The invention claimed is:

1. A diffusely reflecting polarizer comprising a layer containing a first polymer which is amorphous and having a birefringence of less than about 0.01, and a second polymer, the first polymer being a continuous phase, and the second polymer being a dispersed phase, wherein said first and second polymers taken together along a first axis for one polarization state of electromagnetic radiation exhibit a diffuse reflectivity $R1d$, a specular reflectivity $R1s$, a total reflectivity $R1t$, a diffuse transmittance $T1d$, a specular transmittance $T1s$, and a total transmittance $T1t$, and along a second axis for another polarization state of electromagnetic radiation exhibit a diffuse reflectivity $R2d$, a specular reflectivity $R2s$, a total reflectivity $R2t$, a diffuse transmittance $T2d$, a specular transmittance $T2s$, and a total transmittance $T2t$, the said first and second axes being orthogonal, wherein $R1d$ is greater than $R1s$; and $$T2t/(1-0.5(R1t+R2t))>1.3.$$

2. The polarizer of claim 1 wherein $T2d>T2s$.

3. A diffusely reflecting polarizer obtained by coextruding and stretching a film containing a first polymer which is amorphous and having a birefringence of less than about 0.01, and a second polymer, the first polymer being a continuous phase, and the second polymer being a dispersed phase, wherein said first and second polymers taken together along a first axis for one polarization state of electromagnetic radiation exhibit a diffuse reflectivity $R1d$, a specular reflectivity $R1s$, a total reflectivity $R1t$, a diffuse transmittance $T1d$, a specular transmittance $T1s$, and a total transmittance $T1t$, and along a second axis for another polarization state of electromagnetic radiation exhibit a diffuse reflectivity $R2d$, a specular reflectivity R2s, a total reflectivity R2t, a diffuse transmittance T2d, a specular transmittance T2s, and a total transmittance T2t, the said first and second axes being orthogonal, wherein the parameters of composition, Tg, and refractive index and the stretch temperature and stretch ratio of the first and second polymers are selected to satisfy the equations:

R1d is greater than R1s; and  (1)

$T2t/(1-0.5(R1t+R2t))>1.3$  (2).

4. The polarizer of claim 3 wherein T2d>T2s.

5. A process for making a diffusely reflecting polarizer comprising a first polymer which is amorphous and having a birefringence of less than about 0.01, and a second polymer, the first polymer being a continuous phase, and the second polymer being a disperse phase, wherein said first and second polymers taken together along a first axis for one polarization state of electromagnetic radiation exhibit a diffuse reflectivity R1d, a specular reflectivity R1s, a total reflectivity R1t, a diffuse transmittance T1d, a specular transmittance T1s, and a total transmittance T1t, and along a second axis for another polarization state of electromagnetic radiation exhibit a diffuse reflectivity R2d, a specular reflectivity R2s, a total reflectivity R2t, a diffuse transmittance T2d, a specular transmittance T2s, and a total transmittance T2t, the said first and second axes being orthogonal, wherein the parameters of composition, Tg, and refractive index and the stretch temperature and stretch ratio of the first and second polymers are selected to satisfy the equations:

R1d is greater than R1s; and  (1)

$T2t/(1-0.5(R1t+R2t))>1.3$  (2).

6. The polarizer of claim 5 wherein T2d>T2s.

7. The process of claim 4 wherein the stretch temperature, Ts, satisfies the conditions:

$Tg,1<Ts$  (1)

$Tg,2<Ts<Tg,2+30°$ C.  (2)

wherein Tg,1 and Tg,2 are the Tg's of the first and second polymers.

8. A display device comprising the diffusely-reflecting polarizer of claim 3.

9. A display device comprising the diffusely-reflecting polarizer of claim 1.

* * * * *